(12) United States Patent
Bao et al.

(10) Patent No.: US 9,491,473 B2
(45) Date of Patent: Nov. 8, 2016

(54) MOTION COMPENSATED DE-INTERLACING AND NOISE REDUCTION

(71) Applicant: Amlogic Co., Ltd., Santa Clara, CA (US)

(72) Inventors: Zheng Bao, Shanghai (CN); Dongjian Wang, San Jose, CA (US); Xuyun Chen, San Jose, CA (US)

(73) Assignee: Amlogic Co., Limited, Santa Clara, CA (US)

( * ) Notice: Subject to any disclaimer, the term of this patent is extended or adjusted under 35 U.S.C. 154(b) by 416 days.

(21) Appl. No.: 14/281,442

(22) Filed: May 19, 2014

(65) Prior Publication Data

US 2015/0098497 A1    Apr. 9, 2015

Related U.S. Application Data

(60) Provisional application No. 61/886,595, filed on Oct. 3, 2013.

(51) Int. Cl.
| | |
|---|---|
| *H04N 19/139* | (2014.01) |
| *H04N 19/52* | (2014.01) |
| *H04N 19/105* | (2014.01) |
| *H04N 19/172* | (2014.01) |
| *H04N 19/176* | (2014.01) |
| *H04N 19/112* | (2014.01) |
| *H04N 19/80* | (2014.01) |
| *H04N 19/533* | (2014.01) |
| *H04N 19/523* | (2014.01) |

(52) U.S. Cl.
CPC .......... *H04N 19/139* (2014.11); *H04N 19/112* (2014.11); *H04N 19/176* (2014.11); *H04N 19/523* (2014.11); *H04N 19/533* (2014.11); *H04N 19/80* (2014.11)

(58) Field of Classification Search
CPC .. H04N 19/139; H04N 19/52; H04N 19/105; H04N 19/172; H04N 19/521; H04N 7/014; H04N 5/145
See application file for complete search history.

(56) References Cited

U.S. PATENT DOCUMENTS

| | | | |
|---|---|---|---|
| 7,324,160 B2 * | 1/2008 | Yang | H04N 5/145 348/542 |
| 8,351,510 B1 * | 1/2013 | Masterson | H04N 7/012 375/240.16 |
| 2012/0328025 A1 * | 12/2012 | Chang | H04N 7/014 375/240.16 |

* cited by examiner

*Primary Examiner* — Obafemi Sosanya
(74) *Attorney, Agent, or Firm* — Venture Pacific Law, PC

(57) ABSTRACT

A video processing system for de-interlacing a video signal comprises a motion estimation block, a refinement motion estimation block, and a de-interlacer. The motion estimation block generates integer motion vectors for the video signal. The refinement motion estimation block generates fractional motion vectors as a function of the generated integer motion vectors and select frames of the video signal. The de-interlacer generates an output as a function of the generated fractional motion vectors and the selected frames of the video signal.

16 Claims, 4 Drawing Sheets

MOTION COMPENSATED DE-INTERLACING AND NOISE REDUCTION

CROSS REFERENCE

This application claims priority from a provisional patent application entitled "Motion Compensated De-Interlacing and Noise Reduction" filed on Oct. 3, 2013 and having an application Ser. No. 61/886,595. Said application is incorporated herein by reference.

FIELD OF INVENTION

This disclosure generally relates to video processing, and, in particular, to methods, systems, and apparatuses for motion compensated de-interlacing and noise reduction of interlaced video frames.

BACKGROUND

De-interlacing is the process of converting interlaced video frames, such as common analog television signals, into a non-interlaced video frames for display. Interlaced video frames consist of two sub-fields taken in sequence, where the fields are sequentially scanned at odd and even lines of the image sensor. The advantage of interlaced frames is that it requires less transmission bandwidth than transmitting the entire image frame, which is a critical factor when transmitting video data.

Many current display systems, e.g., liquid crystal displays ("LCDs"), plasma screens, and other high definition ("HD") displays, generate displays using a progressive scan format. In the progressive scan format, the lines of each frame are sequentially displayed. Thus, sub-fields of interlaced video data need to be combined into single frames by a de-interlacing process so that the video data can be displayed in the progressive scan format. Several de-interlacing techniques exist for converting interlaced video into progressive scan video. However, each of the techniques has significant drawbacks.

For instance, FIG. 1 illustrates a block diagram of a prior art method for processing a video signal by noise reduction and de-interlacing. A video signal for various video formats can have interlaced frames. In order to view the video signal, the interlaced frames are de-interlaced during decoding for output to a display. To improve the quality of the outputted de-interlaced video signal, noise reduction can be applied to the interlaced frames of the video signal to reduce noise and any other artifacts.

An interlaced frame of the video signal F(n) and a noise reduced frame of the video signal F'(n-2) can be inputted to a motion estimation ("ME") block 10, a motion estimation block 12 and a three dimensional ("3D") motion compensation noise reduction ("MCNR") block 14. The video signal F(n) can have even frames or odd frames for every consecutive number of n. An example is when n=0, 2, 4, 6, 8, 10, etc., the video frames F(n) are all even frames, meaning each even frame contains pixel information for even numbered lines of the video. When n=1, 3, 5, 7, 9, etc., the video frames F(n) are all odd frames, meaning each odd frame contains pixel information for odd numbered lines.

The motion estimation block 10 receives the frame data F(n) and F'(n-2), consecutive odd numbered frames or even numbered frames, and generates motion vectors MV(n-1) for the frame n-1. Next, the motion vectors MV(n-1), interlaced frame F(n), and interlaced frame F'(n-2) are inputted to the noise reduction block 14. The noise reduction block 14 generates a noise reduced frame F'(n), which is stored in memory 24 for later retrieval. The memory 24 can be a buffer, cache or other memory location for the noise reduced frames F'(n) to be stored. In fact, the previous noise reduced frame F'(n-2) is retrieved from memory to be inputted to the ME block 10, the ME block 12, and the noise reduction block 14.

The previous noise reduced frame F'(n-2) and the current noise reduced frame F'(n) are inputted to the ME block 12 to generate motion vectors MV(n-1). The generated motion vectors MV(n-1) can be further post processed using a MV post processing block 16, and then stored in a memory 26 for motion vectors MV( ). The memory 26 can be a buffer, cache, or other memory for storing motion vectors.

A de-interlacer 18 can retrieve motion vectors from the memories 24 and 26 and from an edge interpolator 22 to blend the various inputs for the de-interlacer output F'(n-k, x, y), where k is greater than one and is the frame number delay relative to n, and x and y are coordinate positions of pixels to be displayed. The variable k can be typically 1, 2, or 3 based on the system requirements, where the smaller the k, the smaller the latency will be.

The problem with such system is that the ME blocks 10 and 12 require an enormous amount of resources for the ME calculations to be performed. In this example, there needs to be two dedicated ME blocks for generating an acceptable de-interlaced frame, where each ME block requires a large number of line buffers. In fact, the motion estimation is the most computationally demanding process in image processing applications. Accordingly, the motion estimation engine is very crucial to the performance of video compression and video processing. Therefore, there exists a desire to provide new methods and systems for video processing of interlaced video data that can reduce the complexity and resources used to generate a de-interlaced frame of the video data.

SUMMARY OF INVENTION

Briefly, the disclosure relates to a video processing system for de-interlacing a video signal, comprising: a motion estimation block, wherein the motion estimation block generates integer motion vectors for the video signal; a refinement motion estimation block, wherein the refinement motion estimation block generates fractional motion vectors as a function of the generated integer motion vectors and select frames of the video signal; and a de-interlacer, wherein the de-interlacer generates an output as a function of the generated fractional motion vectors and the selected frames of the video signal.

DESCRIPTION OF THE DRAWINGS

The foregoing and other aspects of the disclosure can be better understood from the following detailed description of the embodiments when taken in conjunction with the accompanying drawings.

DETAILED DESCRIPTION OF THE EMBODIMENTS

In the following detailed description of the embodiments, reference is made to the accompanying drawings, which form a part hereof, and in which is shown by way of illustration of specific embodiments.

Figure 1:
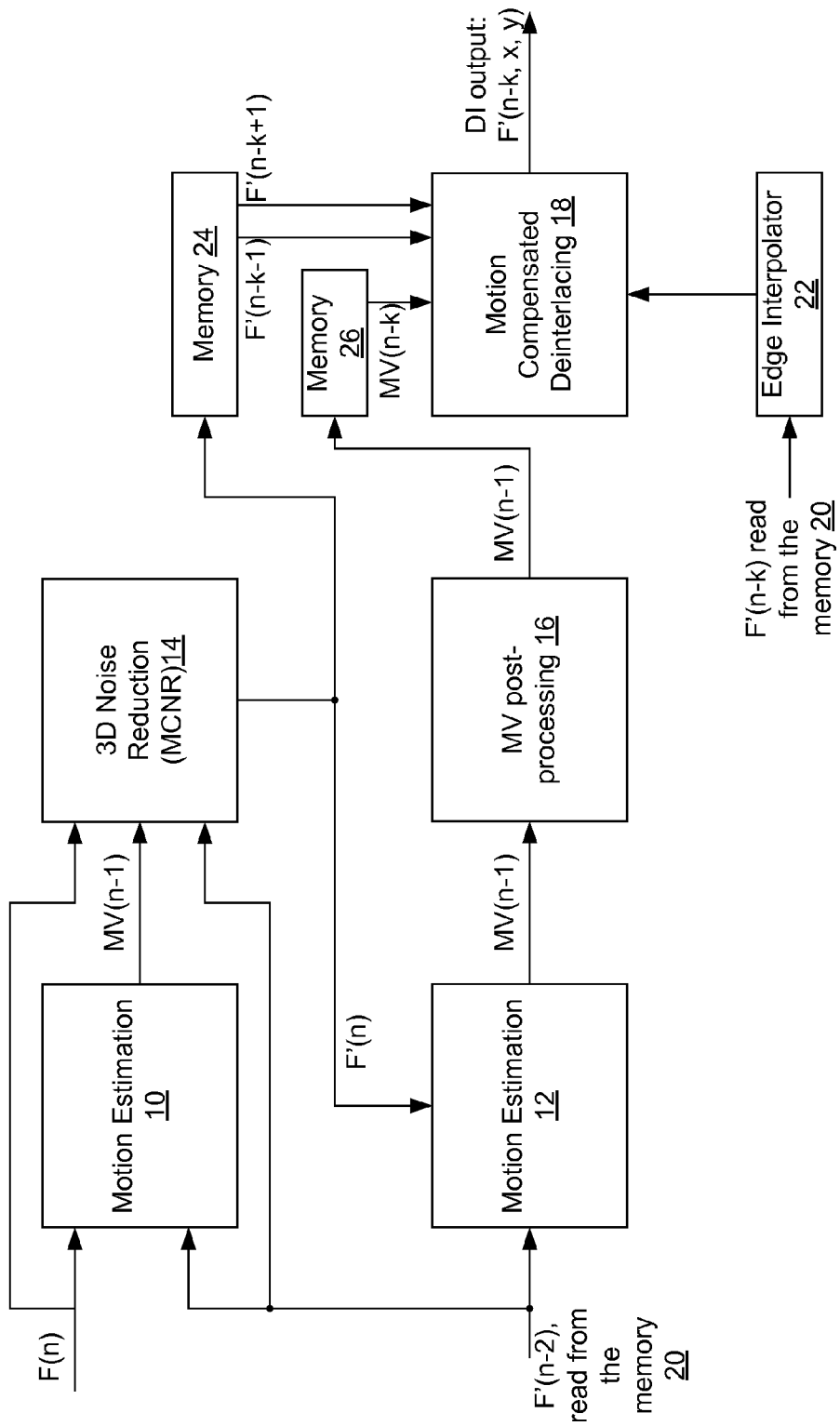
FIG. 1 illustrates a prior art block diagram for applying noise reduction and de-interlacing to an interlaced video signal using two motion estimation engines.
Figure 2:
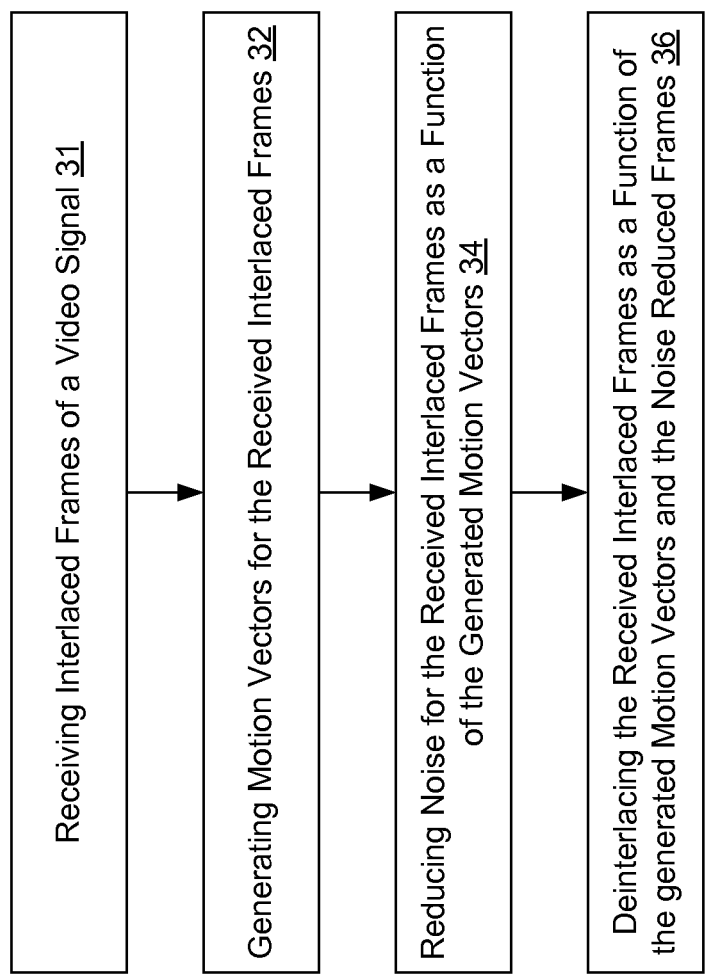
FIG. 2 illustrates a flow chart for processing a video signal.

FIG. 2 illustrates a flow chart for processing a video signal. A video processor (or other video processing equipment) can receive interlaced frames of a video signal 31 for processing. Various standard algorithms can be applied for generating motion vectors for the received interlaced frames 32. For instance, a hierarchical block matching ("HBM") method, a phase plane correlation ("PPC") method, or other motion estimation algorithms can be used to generate motion vectors based on the received interlaced frames. Next, noise can be reduced using a temporary low pass filter (e.g., an infinite impulse response ("IIR") filter) for the received interlaced frames as a function of the generated motion vectors 34. These noise reduced frames can be stored and reused for further calculations by the video decoder for later use. The received interlaced frames can then be de-interlaced as a function of the generated motion vectors and the noise reduced frames 36.

Figure 3:
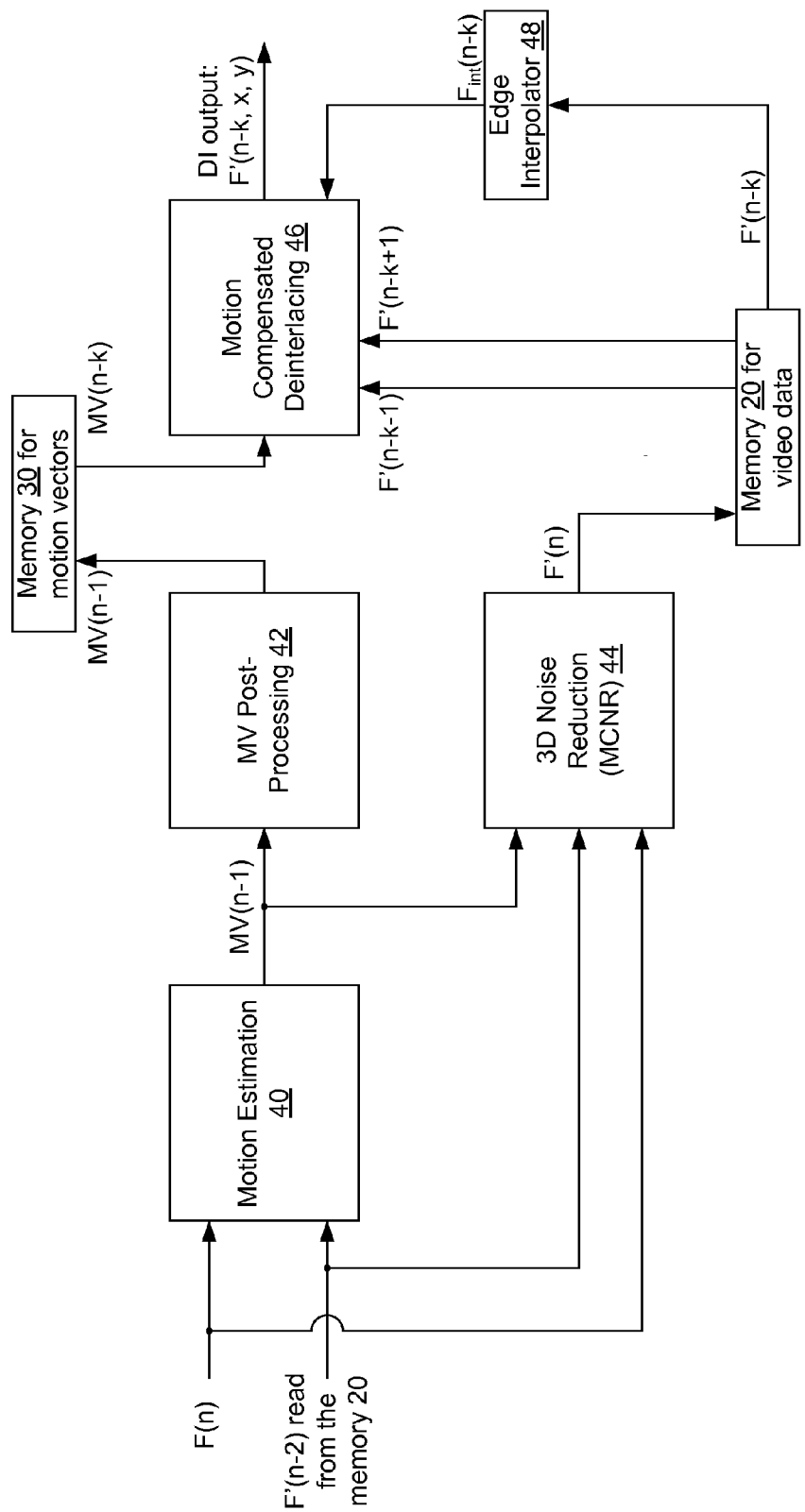
FIG. 3 illustrates a block diagram for applying noise reduction and de-interlacing to an interlaced video signal.

FIG. 3 illustrates a block diagram for processing a video signal by noise reduction and de-interlacing. Interlaced frames F(n) are de-interlaced during decoding for output to a display. The video signal F(n) can have even frames or odd frames, where the order of the even and odd frames is alternating. An example is when n=0, 2, 4, 6, 8, 10, etc., the video frames F(n) are all even frames, meaning each even frame contains pixel information for even numbered lines of a frame of the video signal. When n=1, 3, 5, 7, 9, etc., the video frames F(n) are all odd frames, meaning each odd frame contains pixel information for odd numbered lines of a frame of the video signal.

An interlaced frame F(n) of the video signal and a noise reduced frame F'(n−2) of the video signal can be inputted to a motion estimation block 40 and a noise reduction block 44. The motion estimation block 40 receives the F(n) and F'(n−2), two consecutive frames of odd or even frames, are used to generate motion vectors MV(n−1) for the frame n−1 by using ME algorithms. The generated motion vectors MV(n−1) can be further post processed using a MV post processing block 42, which can be stored in a memory 30 for later retrieval. The memory 30 can be a buffer, cache, or other memory for storing motion vectors.

The motion vectors MV(n−1), interlaced frame F(n), and interlaced frame F'(n−2) are inputted to the noise reduction block 44. The noise reduction block 44 can generate a noise reduced frame F'(n), which is stored in a memory 20 for later retrieval. The memory 20 can be a buffer, cache or other memory location for the noise reduced frames F'(n) to be stored. In fact, the previous noise reduced frame F'(n−2) is retrieved from memory to be inputted to the ME block 40 and the noise reduction block 44.

A motion compensated de-interlacer 46 can retrieve motion vectors MV(n−k) from the memory 30, noise reduced frames F'(n−k−1) and F'(n−k+1) from the memory 20, and an edge interpolated frame $F_{int}$(n−k) from an edge interpolator 48 to blend the various inputs for the de-interlacer output F'(n−k, x, y), where k is great than one and is the frame number delay relative to n, and x and y are coordinate positions of pixels to be displayed. Edge interpolation can be accomplished by an edge based interpolation method, including a simple vertical interpolation.

Figure 4:
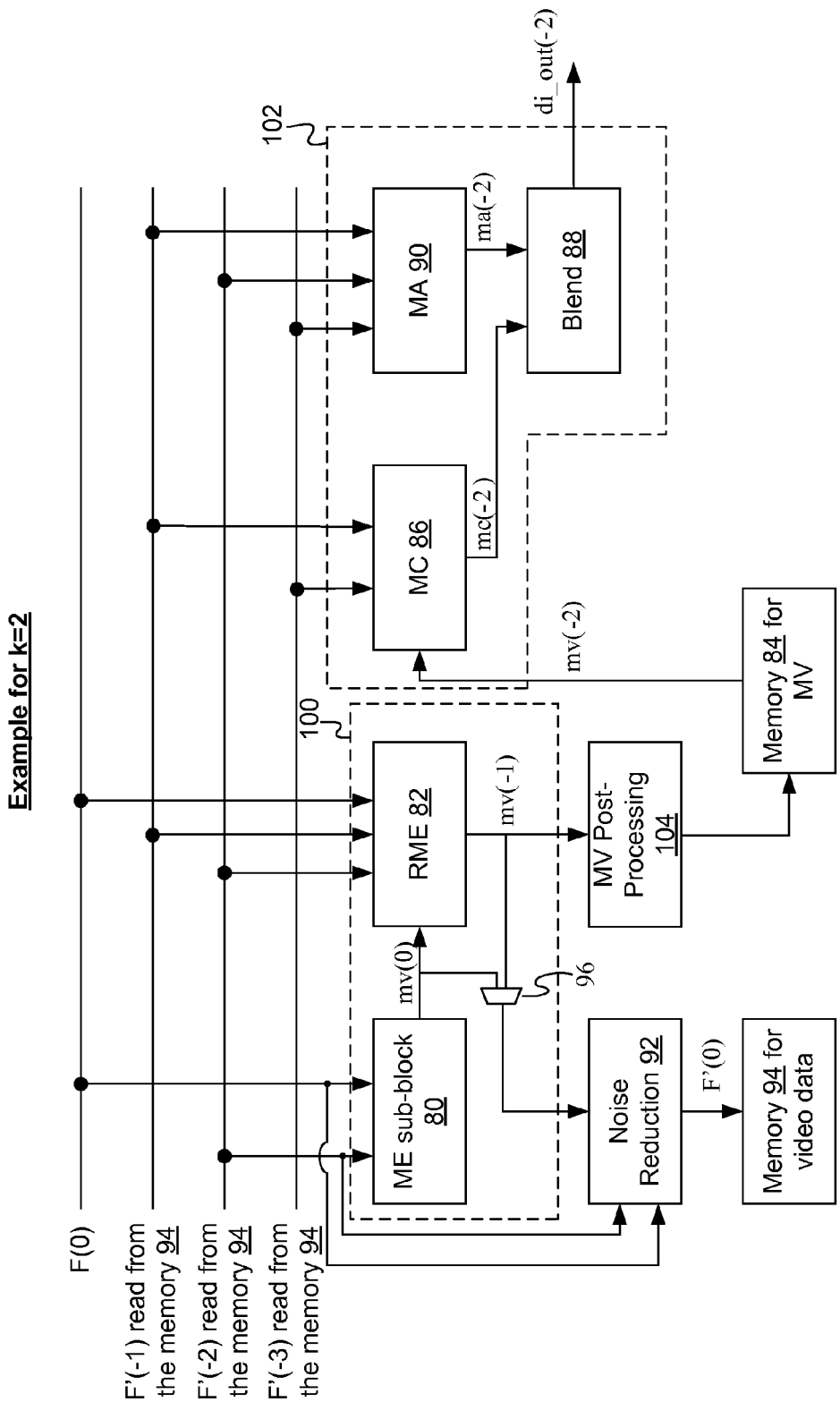
FIG. 4 illustrates a block diagram of a video processing system for processing a video signal.

FIG. 4 illustrates a block diagram of a video processing system for processing a video signal. A video processing system comprises a motion estimation engine 100, a de-interlacer 102, a noise reduction block 92, a memory 94 for storing video data, a motion vector processing block 104, and a memory 84 for storing motion vectors MV( ) for frames.

The ME engine 100 comprises an ME block 80, a refinement ME block 82, and a multiplexer 96. The ME block 80 can provide integer motion vectors. The refinement ME block 82 can provide refined motion vectors of fractional motion vectors. Assuming the delay between the input of the block diagram and the output of the de-interlacer 102 is k=2 and n=0, then a current frame of video data is F(0) and a noised reduced frame F'(−2), i.e., two frames away from F(0) and for the same even or odd lines of pixels at different times, is inputted to the ME block 80. The ME block 80 calculates the motion vectors for the current frame MV(0) and outputs the values to the refinement ME block 82 and the multiplexer 96. The refinement ME block 82 also receives the frame video data for F(0), F'(−1), and F'(−2) to generate motion vectors MV(−1) for a previous frame from the current frame MV(0). The motion vectors MV(−1) for the previous frame is inputted to the multiplexer 96 and to the MV post processing block 104. The MV processing block 104 further refines the motion vectors MV(−1), which is then stored in the memory 84 for later use.

The multiplexer 96 can be controlled to select either the motion vectors MV(0) or MV(−1) for output to the noise reduction block 92. Due to user defined requirements and/or system requirements, integer motion vectors may be more desirable to use for noise reduction 92, and would thus be selected for output by the multiplexer 96.

The current frame F(0) and the noised reduced frame F'(−2) are inputted to the noise reduction block 92 for generating a noise reduced current frame F'(0). The noise reduced current frame F'(0) can be stored in the memory 94 for video data for later use as a previous frame for future calculations and video processing (e.g., de-interlacing and noise reduction. The generated motion vector MV(−1) can be further post processed by the MV post processing block 104, and then stored to the memory 84 for later retrieval by the de-interlacer 102.

The de-interlacer 102 comprises a motion compensation ("MC") block 86, a motion adaptive ("MA") block 90, and a blender 88. The frames F'(−1) and F'(−3) and the motion vector MV(−2) are inputted to the MC block 86 to generate motion compensated frame data MC(−2). Consecutive frame data F'(−1), F'(−2), and F'(−3) are inputted to the MA block 90 to generate motion adaptive frame data MA(−2). The blender 88 receives the frame data MC(−2) and MA(−2) to generate a de-interlacer output di_out(−2). The blender 88 can determine if the motion compensated frame MC(−2) is below a predefined confidence level. If it is, then the motion adapted frame MA(−2) is used as the de-interlacing output di_out(−2). Otherwise, the motion compensated frame MC(−2) is used as the output di_out(−2). Additionally, other methods can be used to blend the motion compensated frame and the motion adapted frame to generate the de-interlacer output.

While the disclosure has been described with reference to certain embodiments or methods, it is to be understood that the disclosure is not limited to such specific embodiments or methods. Rather, it is the inventor's contention that the disclosure be understood and construed in its broadest meaning as reflected by the following claims. Thus, these claims are to be understood as incorporating not only the apparatuses, methods, and systems described herein, but all those other and further alterations and modifications as would be apparent to those of ordinary skilled in the art.

We claim:

1. A video processing system for de-interlacing a video signal, comprising:
 a motion estimation block, wherein the motion estimation block generates integer motion vectors for the video signal;
 a refinement motion estimation block, wherein the refinement motion estimation block generates fractional motion vectors as a function of the generated integer motion vectors and the video signal; and
 a de-interlacer, wherein the de-interlacer generates an output as a function of the generated fractional motion vectors and the video signal,
 wherein the de-interlacer comprises a motion compensation block, a motion adaptive block, and a blender,
 wherein the motion compensation block generates a motion compensated frame as a function of the generated fractional motion vectors, a first noise reduced frame of the video signal, and a third noise reduced frame of the video signal, and
 wherein the motion adaptive block generates a motion adaptive frame as a function of the first noise reduced frame of the video signal, a second noise reduced frame of the video signal, and a third noise reduced frame of the video signal.

2. The video processing system of claim 1 wherein the integer motion vectors are generated as a function of a second noise reduced frame of the video signal and a certain frame of the video signal.

3. The video processing system of claim 1 wherein the fractional motion vectors are generated as a function of a first noise reduced frame of the video signal, a second noise reduced frame of the video signal, and a certain frame of the video signal.

4. The video processing system of claim 1 further comprising a noise reduction block, wherein the noise reduction block generates a noise reduced frame for the certain frame as a function of a second noise reduced frame, the certain frame, and a selected one of the following of the generated integer motion vectors and the generated fractional motion vectors.

5. The video processing system of claim 4 further comprising a multiplexer, wherein the multiplexer selects one of the following of the generated integer motion vectors and the generated fractional motion vectors to output to the noise reduction block.

6. The video processing system of claim 1 wherein the motion compensation block generates a motion compensated frame as a function of the generated fractional motion vectors and certain ones of the frames of the video signal.

7. The video processing system of claim 1 wherein the motion adaptive block generates a motion adapted frame as a function of certain ones of the frames of the video signal.

8. The video processing system of claim 1 wherein the blender blends the motion compensated frame and the motion adapted frame for output of the de-interlacer.

9. The video processing system of claim 8 wherein if the motion compensated frame is below a predefined confidence level, then the motion adapted frame is outputted from the de-interlacer.

10. A video processing system for de-interlacing a video signal, comprising:
 a motion estimation block, wherein the motion estimation block generates integer motion vectors for the video signal as a function of a second noise reduced frame of the video signal and a certain frame of the video signal;
 a refinement motion estimation block, wherein the refinement motion estimation block generates fractional motion vectors as a function of the generated integer motion vectors, a first noise reduced frame of the video signal, the second noise reduced frame of the video signal, and the certain frame of the video signal; and
 a de-interlacer, wherein the de-interlacer generates an output as a function of the generated fractional motion vectors and the video signal,
 wherein the de-interlacer comprises a motion compensation block, a motion adaptive block, and a blender,
 wherein the motion compensation block generates a motion compensated frame as a function of the generated fractional motion vectors, a first noise reduced frame of the video signal, and a third noise reduced frame of the video signal, and
 wherein the motion adaptive block generates a motion adaptive frame as a function of the first noise reduced frame of the video signal, a second noise reduced frame of the video signal, and a third noise reduced frame of the video signal.

11. The video processing system of claim 10 further comprising a noise reduction block and a multiplexer, wherein the noise reduction block generates a noise reduced frame for the certain frame as a function of a second noise reduced frame, the certain frame, and a selected one of the following of the generated integer motion vectors and the generated fractional motion vectors, and wherein the multiplexer selects one of the following of the generated integer motion vectors and the generated fractional motion vectors to output to the noise reduction block.

12. The video processing system of claim 10 wherein the motion compensation block generates a motion compensated frame as a function of the generated fractional motion vectors and certain ones of the frames of the video signal.

13. The video processing system of claim 10 wherein the motion adaptive block generates a motion adapted frame as a function of certain ones of the frames of the video signal.

14. The video processing system of claim 10 wherein the blender blends the motion compensated frame and the motion adapted frame for output of the de-interlacer.

15. The video processing system of claim 14 wherein if the motion compensated frame is below a predefined confidence level, then the motion adapted frame is outputted from the de-interlacer.

16. A video processing system for de-interlacing a video signal, comprising:
 a motion estimation block, wherein the motion estimation block generates integer motion vectors for the video signal as a function of a second noise reduced frame of the video signal and a certain frame of the video signal;
 a refinement motion estimation block, wherein the refinement motion estimation block generates fractional motion vectors as a function of the generated integer motion vectors, a first noise reduced frame of the video signal, the second noise reduced frame of the video signal, and the certain frame of the video signal;
 a de-interlacer, wherein the de-interlacer generates an output as a function of the generated fractional motion vectors and the video signal,
 wherein the de-interlacer comprises a motion compensation block, a motion adaptive block, and a blender,
 wherein the motion compensation block generates a motion compensated frame as a function of the generated fractional motion vectors, a first noise reduced frame of the video signal, and a third noise reduced frame of the video signal, wherein the motion adaptive block generates a motion adaptive frame as a function of the first noise reduced frame of the video signal, a second noise reduced frame of the video signal, and the third noise reduced frame of the video signal, wherein the motion adaptive block generates a motion adapted frame as a function of the certain ones of the frames of the video signal, wherein the blender blends the motion compensated frame and the motion adapted frame for output of the de-interlacer, and wherein if the motion compensated frame is below a predefined confidence level, then the motion adapted frame is outputted from the de-interiacer;

a noise reduction block, wherein the noise reduction block generates a noise reduced frame for the certain frame as a function of a second noise reduced frame, the certain frame, and a selected one of the following of the generated integer motion vectors and the generated fractional motion vectors; and a multiplexer, wherein the multiplexer selects one of the following of the generated integer motion vectors and the generated fractional motion vectors to output to the noise reduction block.

* * * * *